(12) United States Patent
Knepper et al.

(10) Patent No.: US 6,439,774 B1
(45) Date of Patent: *Aug. 27, 2002

(54) ROTARY AIR BEARING AND PROCESS FOR MANUFACTURING THE SAME

(75) Inventors: Richard A. Knepper, Keene; Keith M. Gordon, Munsonville; Jay M. Landry, Keene, all of NH (US); William E. Harbottle, Fort Lauderdale, FL (US)

(73) Assignee: The Timken Company, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/403,881

(22) PCT Filed: Apr. 16, 1998

(86) PCT No.: PCT/US99/07721
§ 371 (c)(1),
(2), (4) Date: Oct. 15, 1999

(87) PCT Pub. No.: WO98/46894
PCT Pub. Date: Oct. 22, 1998

Related U.S. Application Data (60) Provisional application No. 60/043,722, filed on Apr. 17, 1997.

(51) Int. Cl.⁷ .......................... F16C 32/06; F16C 33/02; B23P 17/04
(52) U.S. Cl. .................... 384/110; 384/297; 29/898.02; 29/898.15; 29/413; 29/424
(58) Field of Search ................................ 384/110, 297, 384/108, 109, 107; 29/898.02, 898.15, 413, 424, 434, 898.12

(56) References Cited
U.S. PATENT DOCUMENTS

| | | | | |
|---|---|---|---|---|
| 3,674,355 A | * | 7/1972 | Yearout et al. ............. 384/110 |
| 3,683,476 A | * | 8/1972 | Lea et al. .................. 29/434 X |
| 3,978,566 A | * | 9/1976 | Ladin ........................ 29/413 X |
| 3,993,371 A | * | 11/1976 | Orndorff .................. 384/297 X |
| 4,140,592 A | * | 2/1979 | Rolando ...................... 205/122 |
| 4,227,756 A | * | 10/1980 | Bhushan .................. 384/109 X |
| 4,691,422 A | * | 9/1987 | Tilgner et al. ............. 29/434 X |
| 4,710,034 A | | 12/1987 | Tittizer et al. |
| 4,715,731 A | * | 12/1987 | Titttizer .................. 384/110 X |
| 4,838,710 A | * | 6/1989 | Ohta et al. ............... 384/107 X |
| 4,875,263 A | | 10/1989 | Furumura |
| 4,880,319 A | * | 11/1989 | Haggerty ................. 384/297 X |
| 4,884,899 A | * | 12/1989 | Schwartzman .......... 384/110 X |
| 5,173,797 A | * | 12/1992 | Zedekar et al. .......... 384/110 X |
| 5,397,184 A | * | 3/1995 | Murai ......................... 384/110 |
| 5,507,093 A | * | 4/1996 | Wittenstein et al. .......... 29/413 |
| 5,697,708 A | * | 12/1997 | Leuthold et al. ............. 384/110 |
| 5,700,093 A | | 12/1997 | Hiramatsu et al. |
| 5,709,480 A | * | 1/1998 | Hong ...................... 384/108 X |
| 5,718,516 A | * | 2/1998 | Cheever et al. ......... 384/107 X |
| 5,855,436 A | | 1/1999 | Eum et al. |
| 5,855,437 A | | 1/1999 | Lee |
| 5,873,657 A | | 2/1999 | Lee |
| 5,926,342 A | * | 7/1999 | Nose ...................... 384/107 X |
| 5,947,608 A | | 9/1999 | Kim |
| 5,957,587 A | * | 9/1999 | Hong .......................... 384/108 |
| 6,019,516 A | | 2/2000 | Leuthold et al. |

OTHER PUBLICATIONS

Air Bearings for Industry (No date to put on IDS!!!!!).

* cited by examiner

*Primary Examiner*—Charles A Marmor
*Assistant Examiner*—Ha Ho
(74) *Attorney, Agent, or Firm*—Polster, Lieder, Woodruff & Lucchesi, L.C.

(57) ABSTRACT

A rotary air bearing (A) as shown in the Figure has a journal (2) provided with a pair of outwardly presented tapered surfaces located opposite the tapered surfaces on the journal, and a low friction liner (6) bonded to the tapered surfaces on the hub and having tapered surfaces which are separated from the tapered surfaces of the journal by small air gaps (g).

46 Claims, 5 Drawing Sheets

ROTARY AIR BEARING AND PROCESS FOR MANUFACTURING THE SAME

This application claims priority from provisional application Ser. No. 60/043,722, filed Apr. 17, 1997.

BACKGROUND ART

This invention relates in general to bearings and more particularly to rotary air bearings and processes for manufacturing the same.

In some equipment rotors revolve at extremely high velocities, yet with considerable precision. For example, the disk in the disk drive of a computer rotates at a high velocity to facilitate rapid storage and retrieval of information, but the disk must also run true both axially and radially. Indeed, the disk must be essentially free of nonrepetitive runout and error in motion (wobble). This insures that the tracks on the disk remain precisely in the same position and prevents the heads which read the disk from scraping the disk. Rotary mirrors for optical scanners must likewise rotate at high velocities with high precision. The same holds true with regard to the rotors in gyroscopes.

To a measure ball bearings have accommodated the demands of such equipment. But as the velocity and precision with which such equipment operates increases, the capability of ball bearings to satisfy these demands has diminished. The typical ball bearing used in rotary applications includes inner and outer races with rolling elements in the form of balls located between the races. When one race rotates relative to the other, the balls roll along raceways on the two races. The rolling contact keeps friction minimal. Even so, geometric inaccuracies in the balls and the raceways may translate into motions that occur at nonintegral fractions of spinspeed and thus do not lend themselves to compensation. This is detrimental to the operation of the equipment. Moreover, they set up vibrations which in their own right are detrimental. Furthermore, ball bearings require lubricants which may migrate into regions where they will adversely affect the operation of the equipment.

So-called air or gas bearings accommodate extremely high velocities with considerable precision, and thus overcome the primary deficiencies of ball bearings. In that sense they are well-suited for high speed equipment such as disk drives and optical scanners, but they have not found favor with the manufacturers of such equipment because of the extremely close tolerances required in the manufacture of such bearings and the expense required to maintain those tolerances.

The typical air bearing includes a journal and a hub, one of which revolves with respect to the other. Sometimes a small electric motor is integrated into the journal and hub to effect the rotation. The journal and hub have matching surfaces which, during the operation of the bearing, are separated by a thin layer of air. Hence, the surfaces do not contact each other and essentially no friction exists to impede the rotation. The air for the film may come from an external source (hydrostatic) or it may derive from the rotation itself (hydrodynamic). Bearings which operate on the latter principle normally have grooves to elevate the pressure in the air gap between opposed thrust-oriented surfaces. Such bearings are referred to as self-acting bearings.

In one configuration the self-acting air bearing has its opposed thrust-oriented surfaces tapered down from each end toward the mid-region of the bearing. The tapers, in effect, capture the hub on the journal, but this presents manufacturing problems. In this regard, the tapered regions of the journal are normally manufactured separately and then assembled within the hub. Since the two tapered regions are not machined on the same center, the possibility exists that their axes may not coincide precisely as they must when assembled in the hub. This produces error in motion. Then there is the usual problem of maintaining roundness and consistency between the matching tapered surfaces of the journal and hub, not to speak of a uniform air gap on the order of 50 to 100 microinches.

These demands require precision machining and grinding and even lapping which is reflected in the price of such bearings, making them considerably more expensive than conventional ball bearings. Hence, most of the high velocity equipment uses traditional ball bearings.

The present invention resides in an air bearing having opposed tapered surfaces, one of which lies along a material that is molded along the other surface and then separated slightly from the other surface. The invention also resides in the process for manufacturing a bearing. That process includes providing inner and outer members, one of which has tapered surfaces and using those tapered surfaces to configure and provide conforming tapered surfaces for a liner that lies between the members and bonds to the other member. Actually, the liner is derived from a fluent liner material which is injected between the inner and outer members. But before the fluent liner material is injected, the tapered surfaces on the one member are distorted in the sense that they are displaced axially. This distortion may be achieved by compressing the one member within its elastic limits or by applying a coating to the tapered surfaces. Once the liner material has solidified the distortion is removed, leaving a slight air gap between the tapered surfaces on the one member and the conforming tapered surfaces on the liner. The member with the tapered surfaces or the liner along their tapered surfaces has grooves which serve to pump air and thereby maintain the air gap generally uniform. The invention also consists in the parts and in the arrangements and combinations of parts hereinafter described and claimed.

BRIEF DESCRIPTION OF DRAWINGS

In the accompanying drawings which form part of the specification and wherein like numerals and letters refer to the like parts wherever they occur.

Corresponding reference numerals will be used throughout the several figures of the drawings.

BEST MODE FOR CARRYING OUT THE INVENTION

Referring now to the drawings, a self-acting air bearing A (FIG. 1) includes a fixed journal 2 and a rotary hub 4 which fits around the journal 2 where it revolves about an axis X of rotation, which is the common axis of the journal 2 and hub 4. The journal 2 constitutes the inner member of the bearing A, whereas the hub 4 represents the outer member. The hub 4 has a low friction liner 6 bonded to it, with the liner 6 being presented inwardly toward the journal 2 such that small air gaps g exist between the liner 6 and journal 2. The bearing A may also contain an electric motor 8 which, when energized, imparts torque to the hub 4, causing the hub 4 to rotate about the axis X at high velocity.

Figure 1:
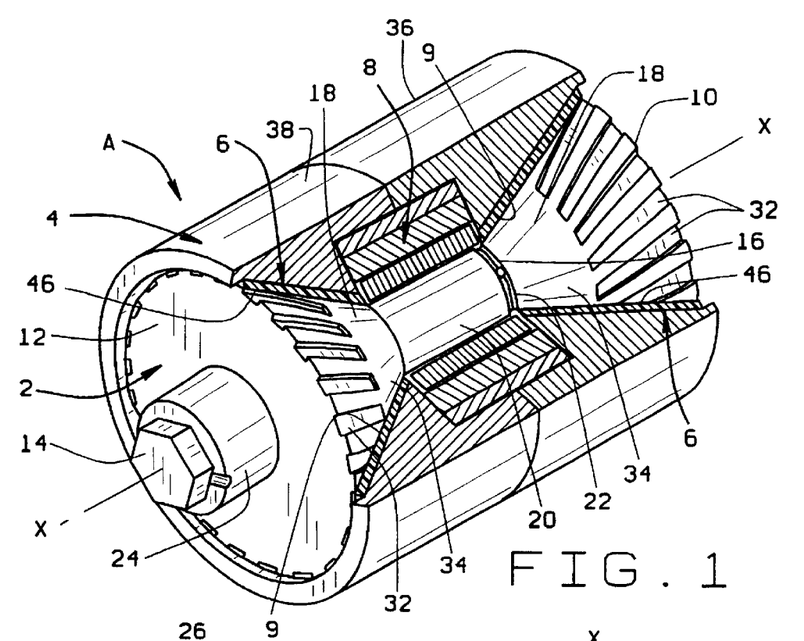
FIG. 1 is a perspective view, partially broken away and in section of an air bearing constructed in accordance with and embodying the present invention.

During the rotation the air within the air gaps g becomes pressurized and separates the fixed journal 2, on one hand, and the rotating hub 4 and liner 6, on the other, so that essentially no friction exists within the bearing A. The air necessary to sustain the film derives from the rotation itself, or in other words the bearing A acts as a pump which forces air into the air gaps g. This air has extremely low viscosity—certainly less than even the thinnest oils—so the hub 4 rotates quite freely. The bearing A operates with considerable precision, there being only minute deviation radially from the axis X and axially along the axis X. Certainly, the precision exceeds that one can achieve with ball bearings. The hub 4 carries a payload, such as a disk or a multisurface mirror.

Figure 2:
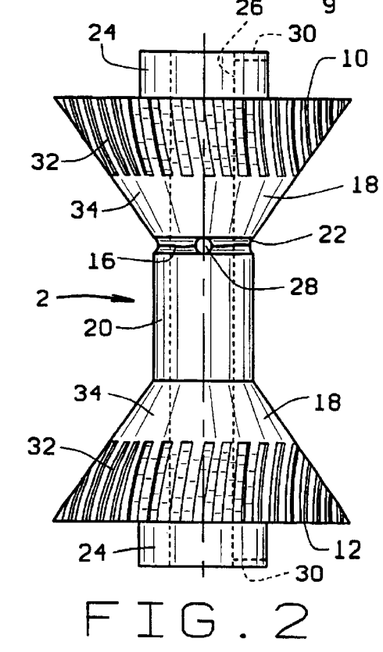
FIG. 2 is an elevational view of the journal for the bearing.

The journal 2 is formed from a hardenable steel, such as 440C, and exists in two sections 10 and 12 which are held firmly together by a bolt or machine screw 14 (FIG. 2). The sections 10 and 12, which are essentially identical, abut along a separating or fracture line 16. Each section 10 and 12 has a conical surface 18 which tapers downwardly toward the fracture line 16, with the conical envelopes formed by the two surfaces 18 preferably having their apices at a common point along the axis X. The conical surfaces 18 of the two sections 10 and 12 are separated by a cylindrical intervening surface 20 out of which a channel 22 opens adjacent to the conical surface 18 on the section 10. The fracture line 16 lies within the channel 22. At their opposite or large ends, the two sections 10 and 12 have cylindrical spindles 24 which are directed axially beyond the ends of the conical surfaces 18.

The journal 2 also contains (FIG. 2) a through bore 26 which extends axially between the two spindles 24 and indeed opens out of the ends of the journal 2 at the spindles 24. The bore 26, which likewise has its axis coincident with the axis X, receives the screw 14 which holds the two sections 10 and 12 firmly together. At the fracture line 16 four radial holes 28 extend between the bore 26 and the channel 22 at equal circumferential intervals. The holes 28 facilitate the formation of the fracture line 16 and alignment of the two sections 10 and 12 angularly along the fracture line 16. In addition, the two spindles 24 contain a means of orientation, such as slots 30 which extend radially across their end faces. The slots 30 also serve to correctly locate the two sections 10 and 12 angularly with respect to each other. Finally, the journal 2 has spiral grooves 32 which open out of its conical surfaces 18, yet are quite shallow, having a depth of about 100 to 300 microinches. The grooves 32 extend all the way out to the large ends of the conical surfaces 18 but terminate short of the small ends so that continuous or smooth frustoconical lands 34 exist on the conical surfaces 18 between the ends of the grooves 32 and the cylindrical intervening surface 20. The grooves 36 serve to pressurize the air in the air gaps g, when the hub 4 and liner 6 revolve about the journal 2, particularly in the regions around the lands 34.

The hub 4 is formed from a light weight and durable substance, such as aluminum, in two axially aligned sections 36 and 38 (FIG. 3) which are held together by a suitable clamping device. The hub 4 has conical surfaces 40 which are presented inwardly toward the axis X and taper downwardly to an intervening cavity 42 that lies between them and is accessible when the sections 36 and 38 are separated. The cavity 42 houses the motor 8. At their opposite ends the conical surfaces 40 open into short end bores 44 which, in turn, open out of the ends of the hub 4. The conical surfaces 40 of the hub 4, insofar as their taper is concerned, conform to the conical surfaces 18 of the journal 2, but are somewhat larger. Indeed, the conical surfaces 36 of the hub 4 lie between 0.025 and 0.050 inches, and preferably about 0.030 inches, beyond the conical surfaces 18 of the journal 2. This spacing far exceeds the size of the air gaps g. The conical surfaces 40 are machined into the hub 4, but the machining requires only a moderate degree of precision and certainly not the precision required for matching surfaces in conventional air bearings.

The low friction liner 6 (FIG. 1) bonds to the conical surfaces 40 of the hub 4 and occupies most of the space between those surfaces and the conical surfaces 18 of the journal 2. It too has conical surfaces 46 which conform in taper to the tapered surfaces 18 of journal 2, yet lie slightly beyond the surfaces 18, so that small clearances exist between the conical surfaces 44 of the liner 6 and the conical surfaces 18 of the journal 2. Those clearances form the air gaps g which, measured radially, should range between 30 and 100 microinches and should preferably be about 50 microinches.

The liner 6 derives from a replicant that should be capable of being applied in a plastic or fluent state. Typically, the replicant is an epoxy resin. It should have the capacity to bond firmly to the material of the hub 4. Moreover, it should faithfully copy or replicate any surface against which it is injected or cast. It should harden with minimal shrinkage. Once hardened, it should have a low coefficient of friction when against a smooth steel surface, particularly the conical surfaces 18 of the journal 2. Resins sold by Diamant Metallplastic GmbH of Moenchengladbach, Germany, under the trademark MOGLICE possess the desired characteristics and are suitable for the liner 6.

The motor 8, which may be a brushless D.C. motor, mounts upon the intervening surface 20 of the journal 2 and within the cavity 40 of the hub 4. The leads for supplying the motor 8 with electrical energy pass through the bore 26 in the journal 2. When energized, the motor 8 exerts a torque on the hub 4, causing the hub 4 to rotate around the journal 2.

Initially, after the motor 8 is energized, the conical surfaces 46 of the resin liner 6 move against the conical surfaces 18 of the journal 2, but the low friction characteristics of the resin accommodate this sliding contact. As the hub 4 accelerates, it pressurizes the air in the gaps g, particularly in the regions between the conical surfaces 46 of the liner 6 and the frustoconical lands 34 on the conical surfaces 18 of journal 2. A layer of air develops in the gaps g for the full circumferences of the gaps g, and the hub 4 and its liner 6, in effect, float on the cushion of air in the gaps g. With the opposing conical surfaces 46 and 18 being separated by a layer of air, essentially no friction exists between the hub 4 and the journal 2, and the air, having extremely low viscosity, does little to impede the rotation. The hub 4 rotates freely.

Figure 4:
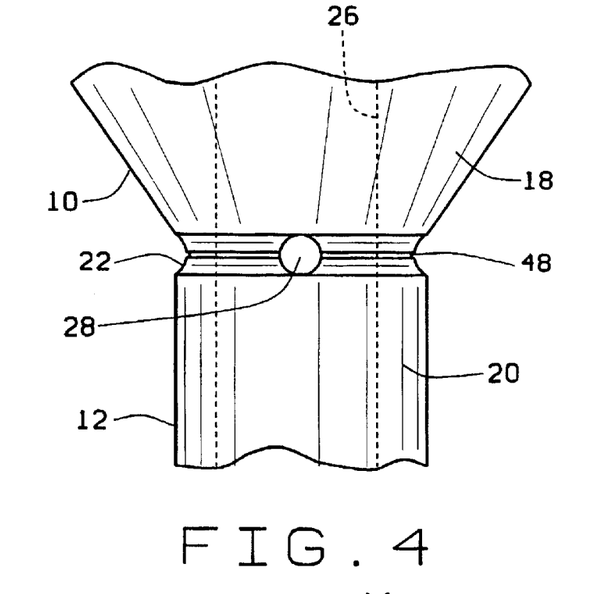
FIG. 4 is a fragmentary elevational view, enlarged, of the region in which the journal fractures.

To manufacture the journal 2, bar stock is turned down to essentially the final configuration for the journal 2, all in a single machine set-up. This produces the conical surfaces 18, the intervening surface 20, the channel 22 and the spindles 24, all as a unitary or integral structure (FIG. 2). In addition, the turning leaves the journal 2 with a small groove or score 48 (FIG. 4), preferably V-shaped with a sharp corner, in the base of the channel 22 midway between the sides of the channel 22. The score 48 creates a stress riser in the journal 2 at its thinnest cross-section. Next, the center through bore 26 and the radial holes 28 are drilled. Thereupon, the machined journal 2 is subjected to a heat treatment which leaves it through hardened and extremely brittle.

Figure 3:
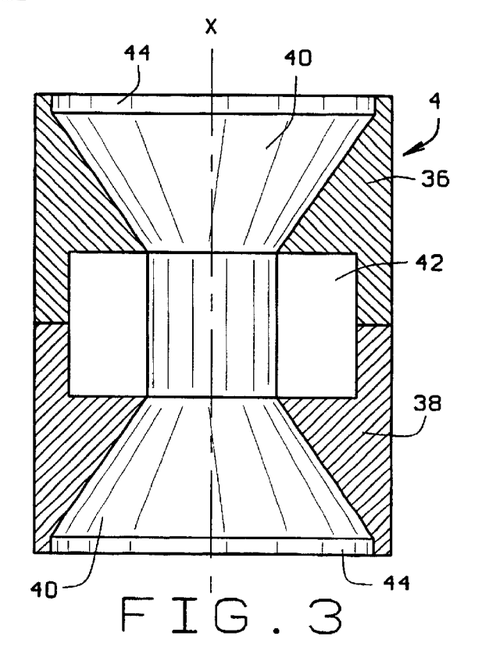
FIG. 3 is a sectional view of the hub for the bearing.

The hub 4 is likewise machined or otherwise derived from suitable substance such as aluminum alloy to produce essentially its final configuration (FIG. 3). Then it is ground along its end faces and outside surface. The conical surfaces 40 of the hub 4 should possess a rough finish to create a strong bond with the resin of the liner 6.

The journal 2, after undergoing the machining and heat treatment, exists in a unitary form and obviously will not fit into the hub 4. Hence, in its final form the journal 2 exists in the two sections 10 and 12 held together with the screw 14. When the sections 10 and 12 are separated, they fit into the opposite ends of the hub 4 and abut within the hub 4, thereby assuming the configuration that existed before the separation.

The separation is achieved with tooling which applies a tensile force to the journal 2 such that the force is directed axially through the journal 2. A simple tensile tester will suffice for this purpose. The tensile force fractures the journal 2 at its weakest cross-section, that is at the score 48 in the channel 22. The fracture produces the fracture line 16 which extends for the full circumference of journal 2 at the channel 22. Actually, the fracture line 16 represents an interface where the two sections 10 and 12 mate perfectly. A blast of air is directed at the surfaces representing the fracture line 16 to remove any loose granules resulting from the fracture. Owing to the brittle character imparted to the steel by the heat treatment, the fracture occurs with minimal plastic deformation of the journal 2 in the region of the fracture line 16. Thus. when the two sections 10 and 12 are brought together at the fracture line 16, the journal 2 possesses essentially the same configuration as it did in its unitary state.

After the machined and hardened journal 2 is fractured its two sections 10 and 12 are aligned axially and angularly and are brought together. To this end, the slots 30 in the ends of the spindles 24 serve as reference marks to facilitate angular alignment, as do the radial holes 28 along the fracture line 16. The screw 14 is inserted through the bore 26 and tightened to hold the sections 10 and 12 snugly together without producing significant elastic deformation in them. In this condition, the tapered surfaces 18 on the two sections 10 and 12 are ground to insure that those surfaces 18 are perfectly round. Indeed, the grinding should leave the surfaces 18 with a deviation from round no greater than about 10 microinches. The grinding also insures that the two conical surfaces 18 are coaxial. Moreover, a release agent is applied to the conical surfaces 18 on the two sections 10 and 12. This substance should prevent the resin from which the liner 6 is formed from bonding to the journal 2 at the surfaces 18.

Now the two sections 10 and 12 are again separated and inserted into opposite ends of the hub 4. Within the hub 4 the two sections 10 and 12 arc aligned axially and, with the aid of the radial slots 30 in the spindles 24, they are further aligned angularly. To hold the sections 10 and 12 together, the screw 14 is again installed through the bore 26 and this time is tightened to apply a clamping force against the ends of the two spindles 24 so as to force the two sections 10 and 12 together within the hub 4. On the other hand, the clamping force may be applied by an external device. The clamping force is quite heavy and compresses the journal 2 within its elastic range, thus distorting the journal 2 in the sense that it drives the conical surface 18 of the section 10 toward the conical surface 18 of the section 12 and perhaps causes the conical surfaces 18 to expand a slight amount radially as well. The journal 2 is further centered with respect to the hub 4 by the tooling in which it is held, so that the conical surfaces 18 of the journal 2 are concentric to the conical surfaces 36 of the hub 4. A relatively large radial clearance exists between the opposed conical surfaces 18 and 36.

Figure 5:
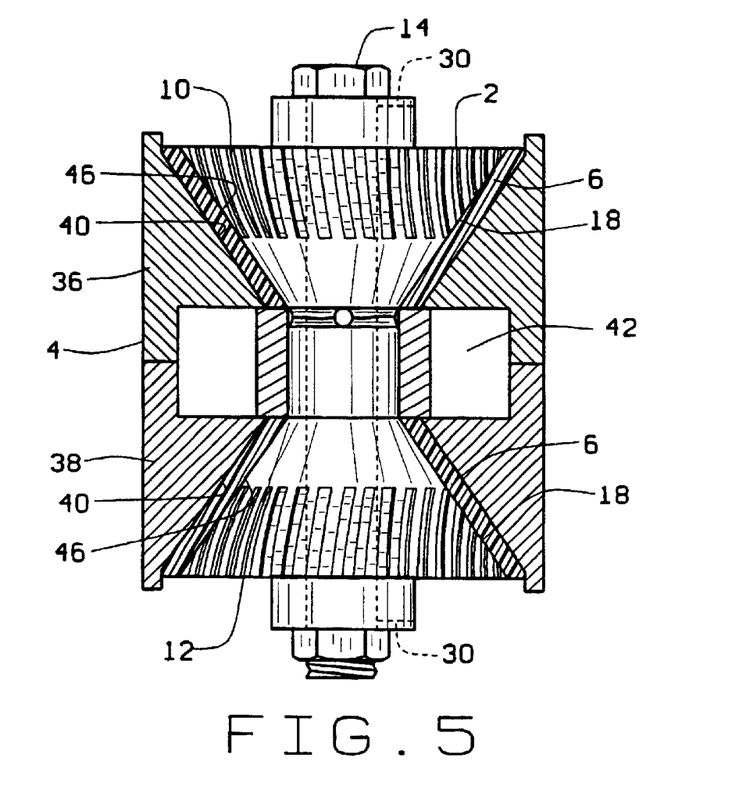
FIG. 5 is a sectional view of the hub and journal after resin is injected between them to form a liner.

Then, while the journal 2 is maintained in a state of heavy compression, the fluent resin for the liner 6 is injected into the annular space defined by the opposed conical surfaces 18 and 36 (FIG. 5). The fluent resin fills the space and is allowed to cure, whereupon it hardens and bonds to the conical surfaces 40 of the hub 4 so that the liner 6 assumes a fixed position with respect to the hub 4.

Once the resin has cured, the clamping force is released, whereupon the journal 2 expands axially, and with this expansion the conical surfaces 18 of the journal 2 back away from the liner 6, leaving the liner 6 with matching surfaces which are in effect its conical surfaces 46. Indeed, the surfaces 46 faithfully replicate the surfaces 18. Owing to the release agent, the liner 6 does not bond to the conical surfaces 18 of the journal 2. The retraction is just enough to produce the air gaps g between the conical surfaces 18 of the journal 2 and the conical surfaces 44 of the liner 6.

At this juncture, the clamping screw 14 is completely withdrawn from the journal 2, and the two sections 10 and 12 are again separated, each being withdrawn from an end of the hub 4. Thereupon, the spiral grooves 32 are imparted to the two sections 10 and 12 at their conical surfaces 18 such as by conventional milling, laser milling or etching. Thereafter, the rotating portion of the motor 8 is installed in the hub 4 and the section 12 of the journal 2 is fitted to the hub 4 and into the stationary portion of the motor 8. Then two sections 10 and 12 are again brought together within the interior of the hub 4 (FIG. 1). Again, the slots 30 are employed to assure correct angular alignment. The screw 14 is installed through the bore 26 and turned down to provide just enough clamping force to hold the sections 10 and 12 firmly together, but not enough to significantly compress the sections 10 and 12. As a consequence, the conical surfaces 18 of the journal 2 are spaced slightly from the conical surface 46 on the liner 6, and this spacing produces the air gaps g which are so critical to the operation of the bearing A.

Figure 6:
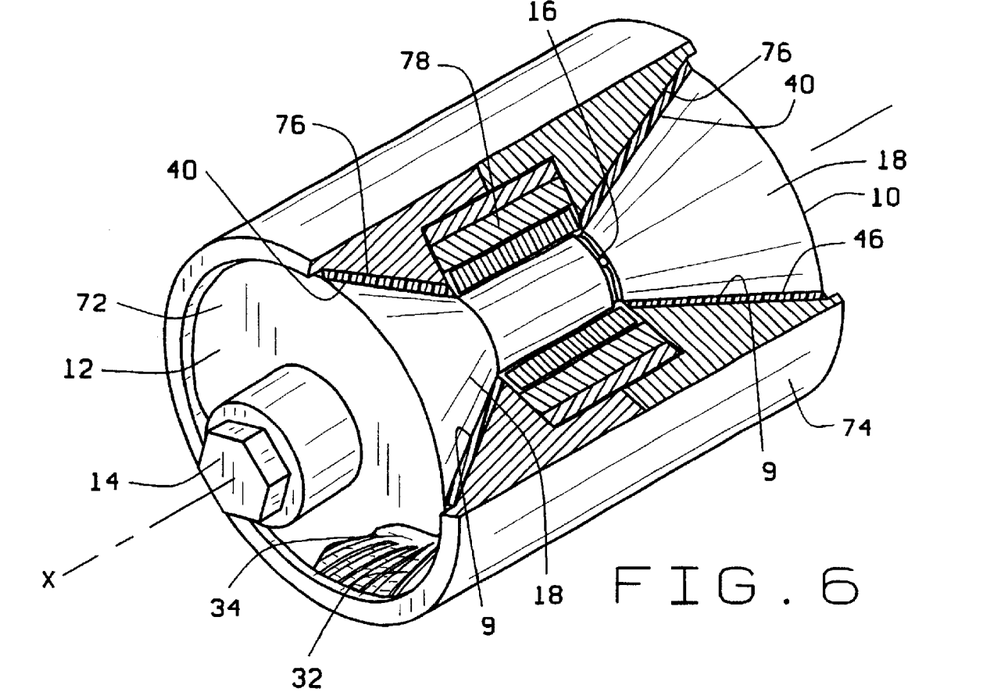
FIG. 6 is a perspective view, partially broken away and in section of a modified air bearing.

The distortion which creates air gaps g need not be derived from axial compression of the journal, but instead may be acquired from a temporary coating applied to one of the two conical surfaces between which the fluent resin is injected to create the liner. Also, the spiral grooves 32, which serve to pressurize the air in the air gaps g, need not be on the journal, but instead may be located in the liner that adheres to the hub. The foregoing variations are embodied in a modified self-acting air bearing B (FIG. 6) and the process for manufacturing it.

Figure 7:
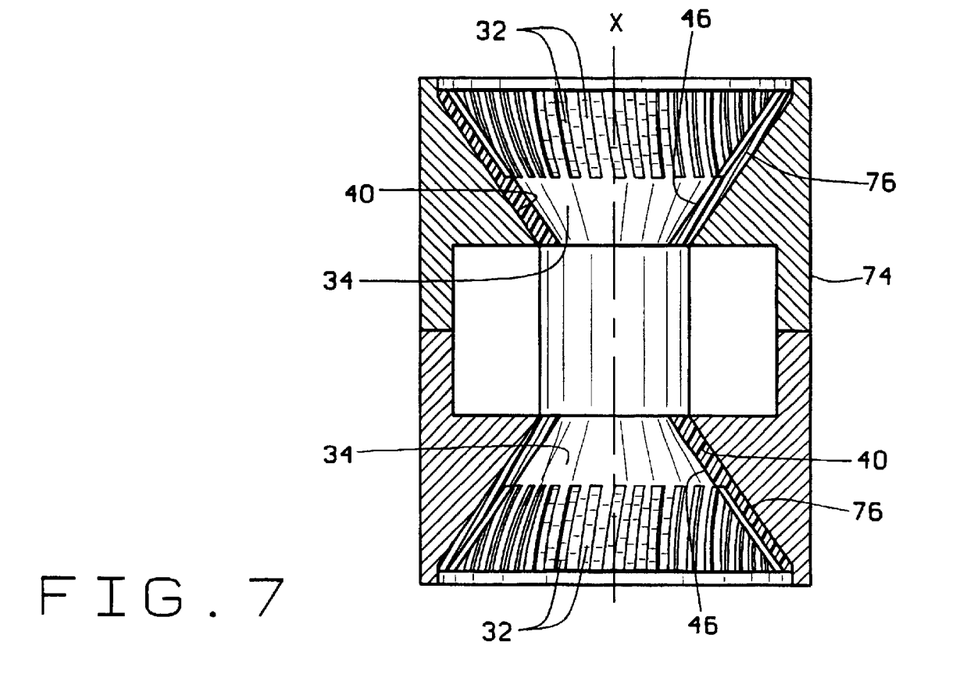
FIG. 7 is a longitudinal sectional view of the hub and liner for the modified bearing.

The air bearing B (FIGS. 6 and 7) includes a journal 72 and a hub 74, as well as a liner 76 which is bonded to the hub 74. It also includes a motor 78 which rotates the hub 74. All are quite similar to their counterparts in the bearing A. However, the spiral grooves 32 lie within the liner 76 instead of in the sections 10 and 12 of the journal 2, and the same holds true for lands 34; they lie along surfaces 46 of the liner 76. Indeed, the grooves 32 extend all the way out to the larger ends of the liner 76, whereas the lands 34 lie closer to reduced portions of the liner 76. The conical surfaces 18 of the sections 10 and 12 for the journal 72, on the other hand, are smooth throughout. The air gaps g lie between the smooth conical surfaces 18 of journal 72 and the grooved conical surfaces 46 of the liner 76.

The motor 78, when energized exerts a torque on the hub 74, causing it to rotate. Initially, the hub 74 rests on the journal 72, with the conical surfaces 46 of the liner 76 being against the conical surfaces 18 on the journal 72. After a few revolutions, the grooves 32 that open out of the liner 76 pump enough air between the conical surfaces 18 and 46 to completely separate those surfaces and this gives generally uniform thickness to the air gaps g. In effect, the hub 74 rotates on a cushion of air, with essentially no friction and low wind resistance.

The journal 72 is turned down from bar stock of a substance that is capable of withstanding subsequent processing without deterioration. Stainless steel will serve in most instances. The turning produces the journal 72 of desired configuration in a single machine set-up and as an integral unit. Thus, its two sections 10 and 12 are joined in the region of the annular channel 22. However, its conical surfaces 18 are not ground or turned to their finished dimensions at this time. Instead, the journal 72 at this juncture is fractured at the annular channel 22, thus producing the fracture line 16 that separates the two sections 10 and 12. The procedure is essentially the same procedure discussed in connection with the journal 2. After the journal 72 undergoes the fracture, its two sections 10 and 12 are aligned and held together with the machine screw 14 which extends through the bore 26 in the journal 72. While the nut or the screw 14 is turned down snugly to hold the two sections 10 and 12 firmly together at the fracture line 16, it is not turned down tightly enough to effect a significant compression of the journal 72. In this condition, the journal 72 is ground or turned along its conical surfaces 18 to impart the desired size and taper to those surfaces 18 and to ensure that they are truly round with their centers along the axis X.

Figure 8:
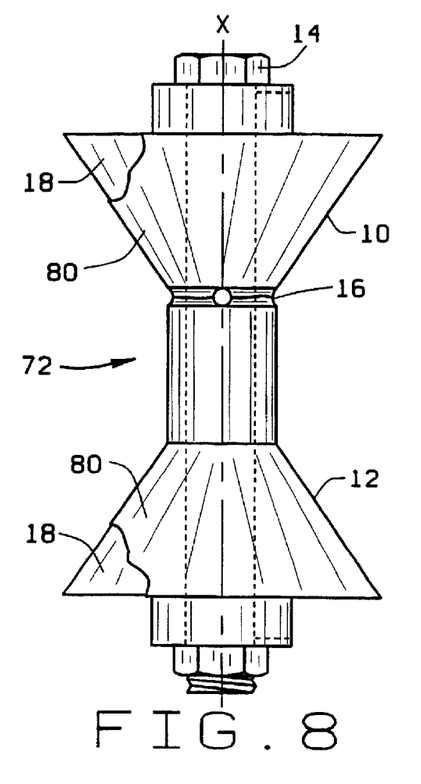
FIG. 8 is an elevational view of the journal for the modified bearing with its tapered surfaces coated.

Once the conical surfaces 18 on the journal 72 have undergone the finished machining, they are covered with a coating 80 (FIG. 8) which adheres temporarily to them. The coating 80 at this juncture has uniform thickness, and that thickness equals the thickness of the air gap g desired for the completed bearing B. Measured radially it should range between 30 and 100 microinches.

In effect, the coating 80 distorts the conical surfaces 18, bringing them axially together, much the same as the axial compression of the journal 2 brought its conical surfaces 18 together. The coating 80 may be electroless nickel (EN) which is applied in a dipping operation. It is characterized as chemical plating as opposed to electrical plating. Electroless nickel and the procedures for applying it have existed for many years.

Figure 9:
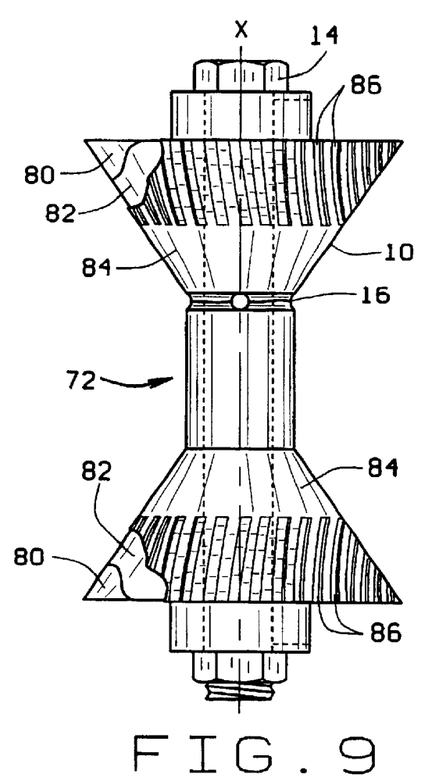
FIG. 9 is an elevational view of the journal for the modified bearing with the coating on its tapered surfaces covered with a photoresist and a mask.

Next the thin coating 80 that overlies each of conical surfaces 18 on the journal 72 is coated with a uniform, thin layer 82 of photoresist (FIG. 9). The photoresist is then baked to harden it. The hardened photoresist layer 82 is, in turn, covered with a mask 84 (FIG. 9) which is opaque. Actually, the mask 84 over each conical surface 18 does not cover all of the photoresist layer 82 on the surface. It leaves certain areas 86 at the large end of the surface 18 uncovered, and those areas 86 correspond in size and area to the spiral grooves 3)2 that the liner 76 will ultimately contain at its large ends. Both the photoresist layer 82 and the mask 84 are applied in the absence of light, or at least in the absence of light of a wavelength and intensity capable of effecting a chemical reaction in the photoresist layer 82.

Thereafter, the journal 72 is exposed to light of a wavelength and intensity to which the photoresist of the layer 82 is sensitive. The uncovered exposed areas 86 undergo a chemical change that renders them soluble to certain chemicals that are commonly known as developers. After the exposure to light the mask 84 is removed and the photoresist is developed. This removes the portions of the photoresist layer 82 in the areas 86 that were exposed to light, but leaves the rest of the photoresist layer 82 in tact. Thus, the photoresist layer 82 contains strip-like bare areas 86 that correspond in area and position to the spiral grooves 32 that are to ultimately appear in the liner 76.

Now a further coating 88 (FIG. 10) is applied to the journal 721 over its coating 80 on its conical surfaces, and this coating 88 may be the same as the coating 80. In the case of electroless nickel (EN) the journal 72 is again dipped in a solution capable of depositing the coating 88 on the journal 72. The coating 88, however, adheres to the underlying coating 80 only in the areas 86 that are not covered by the photoresist layer 82, it does not adhere to the photoresist layer 82 itself. The dipping continues until the thickness of the second coating 88 corresponds to the depth desired for the grooves 32 in the liner 76, and that should be between 75 and 300 microinches.

When the desired thickness for the second coating 88 is achieved, that which remains of the photoresist layer 82 is removed altogether by exposing it to light and developing it. This reveals the underlying coating 80. The second coating 88 takes the form of ribs 90 (FIG. 11) which rise from the underlying coating 80 and represent a true reversal of the grooves 32 which the liner 76 will ultimately contain. A release agent is applied to the journal 72 over the coatings 80 and 88 that cover the conical surfaces 18.

The machine screw 14 is then removed from the journal 72, and the two sections 10 and 12 of the journal 72 are separated at the fracture line 16. Thereupon the journal 72 is reassembled in the hub 74, its two sections 10 and 12 being inserted into opposite ends of the hub 74. There the sections 10 and 12 are aligned and clamped together with the machined screw 14 which is again inserted through the bore 26 in the journal 72. The nut on the screw 14 is again turned down to hold the two sections 10 and 12 firmly together, the torque applied to the nut being essentially the same as the torque applied to it after the fracture and before the finish machining.

Figures 10, 11:
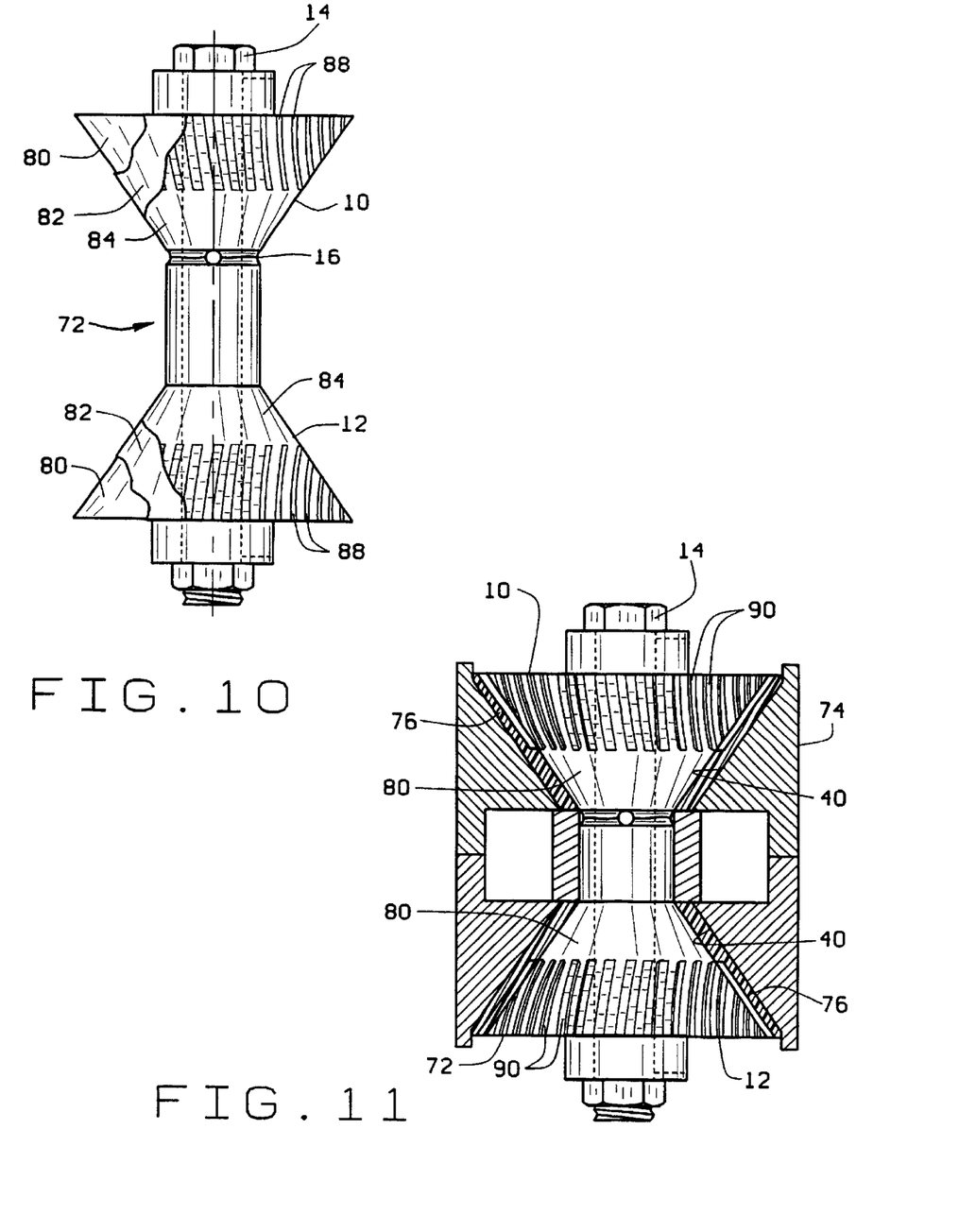
FIG. 10 is an elevational view of the journal for the modified bearing with its photoresist having been developed to expose certain regions of the underlying coating, and a further coating applied to the exposed regions of the underlying coating.
FIG. 11 is a sectional view of the hub and journal for the modified bearing after the resin is injected between them to form the liner.

Now the assembled journal 72 is centered within the hub 74, and the hub 74 and journal 72 are held firmly with respect to each other so that the annular space between the coating 80 on the conical surfaces of the journal 72 and the conical surfaces 46 of the hub 74 is generally uniform in width around the entire journal 72. Next a fluent resin suitable for creating a replicant is injected into the annular space (FIG. 11). The resin solidifies in the space and in so doing bonds to the conical surfaces 46 of the hub 74. The release agent over the coatings 80 and 88 on the journal 72 prevents resin from bonding to the coatings 80 and 88. The resin of course sets up into a solid to form the liner 76.

Once the resin has set, the machine screw 14 is removed from the journal 72, and the two journal sections 10 and 12 are withdrawn from the hub 74 and the liner 76 that now adheres firmly to the hub 74. Being formed against the coatings 80 and 88 that cover the conical surfaces 18 of the hub 72, the liner 76 has conforming conical surfaces 46. Indeed, the surfaces 46 in the regions formed against the coating 80 have the lands 36 and in the regions formed over the second coating 88 contain the grooves 32.

The journal 72, after being withdrawn from the liner 76 in the hub 74, is immersed in an etchant which readily attacks the coatings 80 and 88, but not the stainless steel from which the journal 72 is formed. Where the coatings 80 and 82 are electroless nickel, nitric acid will serves as a suitable etchant.

The coatings 80 and 88 vanish in the presence of the etchant and the machined conical surfaces 18 of the journal 72 are again revealed. Thus, the journal 72 returns to the condition in which it existed immediately after its conical surfaces 18 underwent the final machining.

After the coatings 80 and 88 are removed. The sections 10 and 12 are inserted into opposite ends of the hub 72 with care being taken to insure that the sections 10 and 12 lie within the respective regions of liner 76 that they formed. The sections 10 and 12 are aligned and the machine screw 14 is inserted through the bore 26 and engaged with a nut which is turned down to secure the sections 10 and 12. The torque applied to the nut equals the torque with which the nut was held when the resin was injected into the annular space between the journal 72 and the hub 74—and when the conical surfaces 18 were finished machined. However, the journal 72 no longer conforms precisely to the liner 76. The absence of the coating 80 establishes a slight clearance, which in effect forms the air gaps g, whereas the absence of the second coating 88 totally disengages the journal 72 from the liner 74 and frees the hub 74 and liner 76 for rotation as a unit around the journal 72.

Variations on the two embodiments and processes are available. For example, the hub may remain stationary and the journal may rotate. The resin replicant may be bonded to the conical surfaces 18 of the journal instead of the surfaces 46 of the hub, in which event the surfaces 46 should be machined and otherwise formed with considerably more precision and the surfaces 18 may be formed with less precision. The spiral grooves 32 may be formed at the small diameter ends of the conical surfaces 18 or 46 and the frustoconical lands 34 at the large ends. In that event, the grooves 32 should be configured to pump axially away from the intervening surface 20, instead of toward it, with air being supplied through the radial holes 28. If the replicant has the capacity to shrink upon hardening, then it may not be necessary to compress the journal to force the two sections 10 and 12 toward each other or to apply the coating 80 to acquire the air gap g. If the resin replicant shrinks, the spiral grooves 32 may be placed on conical surface to which the resin bonds and those grooves 32 will replicate themselves in the liner 6 when the resin shrinks. The bearings A or B may exist without the motor, or the motor may be located beyond one end of the journal and hub as a separate component. In that event, the hub need not be formed in sections and the cavity 42 may be omitted.

As various changes could be made in the above constructions without departing from the scope of the invention, it is intended that all matter contained in the above description or shown in the accompanying drawings shall be interpreted as illustrative and not in a limiting sense.

What is claimed is:

1. An air bearing for facilitating rotation about an axis, said bearing comprising:

a first member surrounding the axis;

a second member also surrounding the axis and having tapered surfaces that are presented toward the first member, one of the members having sections which abut at a separating surface such that they can be fitted together and withdrawn from opposite ends of the other member; and a liner attached to the first member and having tapered surfaces that substantially conform to and substantially replicate the tapered surfaces of the second member, but are spaced slightly from the tapered surfaces of the second member so that an air gap exists between the tapered surfaces of the second member and the tapered surfaces of the liner, the liner being substantially thicker than the air gap and having been installed on the first member while in a fluent condition and thereafter having solidified.

2. An air bearing according to claim 1 wherein said one member is configured such that even in the absence of the liner said other member interferes with said one member such that said one member is captured both axially and radially with respect to said other member.

3. An air bearing according to claim 2 wherein the first member has tapered surfaces which are presented toward the tapered surfaces of the second member, and wherein the liner is attached to the first member along the tapered surfaces of the first member.

4. An air bearing according to claim 2 wherein the second member is located within and surrounded by the first member.

5. An air bearing according to claim 1 wherein each tapered surface of the second member contains grooves and a land located beyond the grooves, and the grooves are configured to pump air toward the land.

6. An air bearing according to claim 1 wherein each tapered surface of the liner contains grooves and a land located beyond the grooves, and the grooves are configured to pump air toward the land.

7. An air bearing according to claim 1 and further comprising a fastener for holding the sections of the second member firmly together at the separating surface.

8. An air bearing according to claim 1 wherein the tapered surfaces on the second member are conical, and the envelopes in which those conical surfaces lie have their apices at a common point, along the axis.

9. A process for manufacturing an air bearing that facilitates rotation about an axis, said process comprising:

producing a first member having an axis and a generally axially directed surface that surrounds the axis;

producing a second member that has an axis and tapered surfaces surrounding the axis; separating the second member into sections, each of which has one of the tapered surfaces on it;

fitting the two sections of the second member together from opposite ends of the first member so that the sections abut and positioning the second member such with respect to the first member that the axes of the two members generally coincide and such that the tapered surfaces of the second member are presented toward, yet spaced radially from, the axially directed surface on the first member, whereby an annular cavity exists between the tapered surfaces of the second member and the axially directed surface of the first member;

distorting the second member so that its tapered surfaces are in effect shifted axially relative to each other from a normal position to a displaced position;

while the tapered surfaces of the second member are in their displaced position, inserting a fluent liner material into the annular space and allowing it to solidify against the tapered surfaces of the second member and bond to the axially directed surfaces of the first member, whereby the liner material acquires tapered surfaces that conform to the tapered surfaces of the second member when those surfaces are in their displaced position; and bringing the tapered surfaces of the second member to their normal position, whereby air gaps develop between the tapered surfaces on the second member and the tapered surfaces acquired by the liner.

10. The process according to claim 9 wherein the step of distorting the second member comprises applying to the second member an axially directed compressive force which is within the elastic limits of the second member so as to shift the tapered surfaces on the second member toward each other.

11. The process according to claim 6 and further comprising after injecting the fluent liner material and allowing it to solidify, separating the second member into its sections and withdrawing those sections from the first member; thereafter imparting grooves to the second member at its tapered surfaces; and thereafter fitting the two sections of the second member together from opposite ends of the first member so that the sections abut at the separating line and the tapered surfaces on them lie along the tapered surfaces on the solid liner material.

12. The process according to claim 9 wherein the second member is located within the first member.

13. The process according to claim 9 wherein the step of distorting the second member comprises applying a first coating to the second member along its tapered surfaces, and wherein the step of bringing the tapered surfaces of the second member to their normal positions comprises removing, the first coating.

14. The process according to claim 13 and further comprising applying a second coating in the form of ribs over the first coating before the fluent liner material is injected into the annular cavity, whereby the ribs form grooves in the solidified liner material, with the grooves opening out of the tapered surfaces acquired by the liner material.

15. The process according to claim 14 wherein the step of applying the second coating includes applying a photoresist to the second member over the first coating at the tapered surfaces on the second member, masking the photoresist to cover the regions thereof which will not be occupied by the ribs, exposing the masked photoresist to light, dissolving the photoresist in the regions not masked to remove the photoresist in those regions, so that the second coating will bond to the first coating in the regions where the photoresist has been removed.

16. The process according to claim 13 wherein the step of removing the first coating comprises subjecting the first coating to an etchant.

17. The process according to claim 13 wherein the first coating is electroless nickel.

18. The process according to claim 13 wherein the second member is produced as an integral unit, and the step of separating the second member into sections includes fracturing it between its tapered surfaces.

19. A process for manufacturing a rotary air bearing, said process comprising:

producing an outer member having a pair of tapered surfaces that are presented inwardly toward the axis of the member;

producing an inner member having a pair of tapered surfaces that are presented outwardly away from the axis of the member;

installing the inner member in the outer member such that the two members, by reason of their tapers, are captured axially with respect to each other, yet have their tapered surfaces spaced apart to provide an annular cavity between their tapered surfaces; and inserting a fluent liner material into the annular cavity and allowing the fluent material to harden and bond to one of the members, thereby producing a liner having tapered surfaces presented toward the tapered surfaces on the other member.

20. The process according to claim 19 wherein the inner member is installed in the outer member by fracturing one of the members between its tapered surfaces to provide separable sections, and bringing the sections together at their regions of fracture such that the two members are captured relative to each other.

21. The process according to claim 20 and further comprising compressing the fractured member axially as the fluent liner material is allowed to harden, whereby, when the compressive force is withdrawn, the fractured member expands, so that an air gap exists along the tapered surfaces of the liner.

22. The process according to claim 20 and further comprising covering the tapered surfaces of said other member with a coating prior to injecting the fluent liner material into the annular cavity, and removing the coating after the liner material solidifies to produce an air gap between the tapered surfaces of said other member and the liner.

23. A fluid bearing comprising:

first and second bearing structures, one of which rotates relative to the other about an axis, having, respectively, first and second tapered surfaces which substantially conform to each other, yet are normally spaced apart so that a narrow air gap exists between them, the first bearing structure comprising a hardened liner on which the first tapered surface exists, with the liner having been formed from a material applied in a fluent condition along the second tapered surface such that the first tapered surface derives its shape from the second tapered surface and is a replicant of the second surface even when separated from the second surface, the liner being substantially thicker than the narrow gap.

24. A bearing according to claim 23 wherein the first and second tapered surfaces are configured to render the bearing hydrodynamic.

25. A fluid bearing comprising:

first and second bearing structures, one of which is capable of rotating relative to the other, having, respectively, first and second tapered surfaces which substantially conform to each other and are normally spaced apart to create a narrow gap between the surfaces, the first bearing structure comprising a hardened resin liner defining said first tapered surface that is formed as and is a replicant of the second tapered surface and remains as a replicant of the second tapered surface when separated from the first surface, the hardened resin liner being substantially thicker than the narrow gap.

26. A bearing according to claim 25 wherein the tapered surfaces are further configured such that the bearing is hydrodynamic.

27. A bearing according to claim 26 wherein one of the tapered surfaces is interrupted by grooves which open out of that tapered surface and are configured to pump a fluid between the tapered surfaces when relative rotation occurs between the members.

28. A bearing according to claim 27 wherein the tapered surface that contains the grooves also has a land located beyond the grooves; and wherein the grooves are configured to pump the fluid toward the land.

29. A bearing according to claim 25 wherein the liner is derived from a material that is applied in a fluent condition over the second tapered surface and allowed to there solidify, so that the first tapered surface derives its shape from the second tapered surface.

30. A bearing as defined in claim 25 wherein said liner overlies a surface of said first bearing structure and is adhered to said surface by a bond formed upon curing of said resin from a fluent condition to a solid condition.

31. A bearing as defined in claims 26 wherein one of the tapered surfaces has spiral grooves configured to pressurize fluid in said gap.

32. A bearing as defined in claims 25 wherein said first tapered surface is one of a pair of opposite oriented conical surfaces on said first bearing structure, and said second tapered surface is one of a pair of oppositely oriented conical surfaces on said second bearing structure which face radially toward said first conical surfaces, such that said conical surfaces together define a pair of air gaps between said bearing structures upon rotation of said bearing structures relative to each other about said axis.

33. An air bearing as defined in claim 32 wherein one of said bearing structures has conical opposite end portions received axially and radially within the other of said bearing structures, and said conical opposite end portions are defined by separate sections of said one bearing structure, with said separate sections adjoining each other in mating contact at an interface of surfaces previously formed upon rupturing of said one bearing structure at a fracture location axially between conical opposite end portions.

34. A hydrodynamic bearing comprising:
an outer bearing structure centered on an axis of rotation; and
an inner bearing structure having tapered opposite end portions received axially within said outer bearing structure to define a pair of gaps between said bearing structures upon rotation of said bearing structures relative to each other about said axis;
said tapered opposite end portions being defined by separate sections of said inner bearing structure, with said separate sections adjoining each other in mating contact at a fracture interface of surfaces previously formed upon fracturing of said inner bearing structure at a fracture location axially between said tapered opposite end portions.

35. A bearing as defined in claim 34 wherein said inner bearing structure has a stress riser at said fracture location prior to said fracturing of said inner bearing structure.

36. A bearing apparatus as defined in claim 34 further comprising a fastener interconnecting said separate sections of said inner bearing structure.

37. A bearing according to claim,wherein the outer bearing structure includes a resin liner having tapered surfaces which are presented toward the tapered portions on the inner bearing structure, and the liner is substantially thicker than the gaps between the bearing structures.

38. A process for manufacturing a fluid bearing for accommodating relative rotation about an axis and including a first bearing structure having a tapered surface located around the axis and a second bearing structure also located around the axis where it is presented toward the tapered surface of the first structure, said process comprising bonding a resin liner to the second structure and providing the resin liner with a tapered surface that substantially conforms to the tapered surface on the first structure, all by placing a resin while in a fluent condition against the second structure and along the tapered surface of the first structure and allowing the fluent resin to solidify into the hardened resin liner, whereby the tapered surface on the liner derives its shape from the tapered surface on the first bearing structure.

39. The process according to claim 38 wherein the tapered surface on the liner is spaced from the tapered surface on the first structure so that a fluid-filled gap exists between the tapered surfaces; and further comprising configuring the tapered surfaces such that the bearing is hydrodynamic.

40. A process of manufacturing a hydrodynamic bearing comprising inner and outer bearing structures rotatable relative to each other about an axis, with said inner bearing structure having tapered opposite end portions received axially within said outer bearing structure to define a pair of gaps between said bearing structures upon such relative rotation of said bearing structures, said method comprising the steps of:
forming said inner bearing structure in one piece, with said tapered opposite end portions having specified orientations circumferentially and radially relative to each other;
fracturing said inner bearing structure at a fracture location axially between said tapered end portions to form separate sections of said inner bearing structure;
moving said separate sections of said inner bearing structure axially into mating contact with each other at said fracture location axially inward of said outer bearing structure; and
fastening said separate sections together in said mating contact within said outer bearing structure, whereby said specified orientations of said conical opposite end portions are preserved upon installation of said conical opposite end portions in said outer bearing structure.

41. The process according to claim 40 and further comprising introducing a fluent resin between the tapered end portions of the inner bearing structure and the outer bearing structure and allowing the resin to solidify and harden against the two bearing structures such that it bonds to the outer bearing structure and acquires tapered surfaces that replicate the exterior of the tapered end portion on the inner bearing structure.

42. A process of manufacturing a hydrodynamic bearing comprising inner and outer bearing structures, one of which rotates relative to the other during the operation of the bearing, the inner and outer bearing structures being configured to define a gap between said bearing structures with at least one of the structures having a tapered surface along the gap, said process comprising the steps of:
orienting said bearing structures relative to each other to define a space between said bearing structures;
placing a fluent resin material in said space; and curing said resin material in said space to form a solid resin liner that substantially conforms to said tapered surface.

43. A process as defined in claim 42 and further comprising the step of adhering said liner to one of said bearing structures with a bond formed upon said curing of said resin material.

44. A process as defined in claim 42 and further comprising the steps of compressing one of said bearing structures relative to the other so as to constrict said space in which said resin material is cured, and subsequently expanding said one bearing structure to enlarge said space and thereby to define said gap between said liner and said one bearing structure.

45. A process as defined in claim 42 and further comprising the steps of applying a coating to one of said bearing structures prior to placing said resin material in said space, and removing said coating after said resin material cures and thereby to define said air gap between said liner and said one bearing structure.

46. A process for creating a fluid gap in a bearing having a first structure provided with a tapered surface and a second structure, with one of the structures being capable of rotating relative to the other structure about an axis, said process comprising:

applying a fluent material along the tapered surface of the first structure and allowing it to there solidify so as to form on the second structure a tapered surface that substantially conforms to the tapered surface on the first structure; and allowing for axial displacement between the structures.

* * * * *